United States Patent [19]

Suggitt

[11] Patent Number: 4,468,376

[45] Date of Patent: Aug. 28, 1984

[54] DISPOSAL PROCESS FOR HALOGENATED ORGANIC MATERIAL

[75] Inventor: Robert M. Suggitt, Wappingers Falls, N.Y.

[73] Assignee: Texaco Development Corporation, White Plains, N.Y.

[21] Appl. No.: 374,218

[22] Filed: May 3, 1982

[51] Int. Cl.³ .................. C01B 7/01; C01B 7/08
[52] U.S. Cl. ................. 423/358; 423/240; 423/481
[58] Field of Search ............ 423/481, 358, 240 R

[56] References Cited

U.S. PATENT DOCUMENTS

| | | | |
|---|---|---|---|
| 4,018,879 | 4/1977 | Winnen | 423/481 |
| 4,038,369 | 7/1977 | Winston et al. | 423/240 R |
| 4,059,677 | 11/1977 | Sare et al. | 423/481 |
| 4,125,593 | 11/1978 | Scheifley et al. | 423/481 |
| 4,198,384 | 4/1980 | Robinson | 423/240 R |
| 4,206,186 | 6/1980 | Hölter et al. | 423/236 |
| 4,211,646 | 7/1980 | Westbrook et al. | 423/367 |
| 4,233,280 | 11/1980 | Langens et al. | 423/481 |
| 4,346,069 | 8/1982 | Riegel et al. | 423/481 |
| 4,351,819 | 9/1982 | Riegel et al. | 423/481 |

Primary Examiner—John Doll
Assistant Examiner—Wayne A. Langel
Attorney, Agent, or Firm—Robert A. Kulason; Carl G. Ries; James J. O'Loughlin

[57] ABSTRACT

A method for disposing of a halogenated organic material includes the steps of partially oxidizing the halogenated organic material, a hydrocarbonaceous material, and a nitrogen compound with a free-oxygen containing gas and optionally with a temperature moderator in a synthesis gas generator under partial oxidation conditions. The partial oxidation produces a synthesis gas containing, among others, hydrogen halide and ammonia. The synthesis gas is then contacted with a quench medium which dissolves the hydrogen halide into the quench medium. The hydrogen halide and quench medium can be disposed of by the addition of a base to form a readily disposed metal salt of the halide.

14 Claims, 1 Drawing Figure

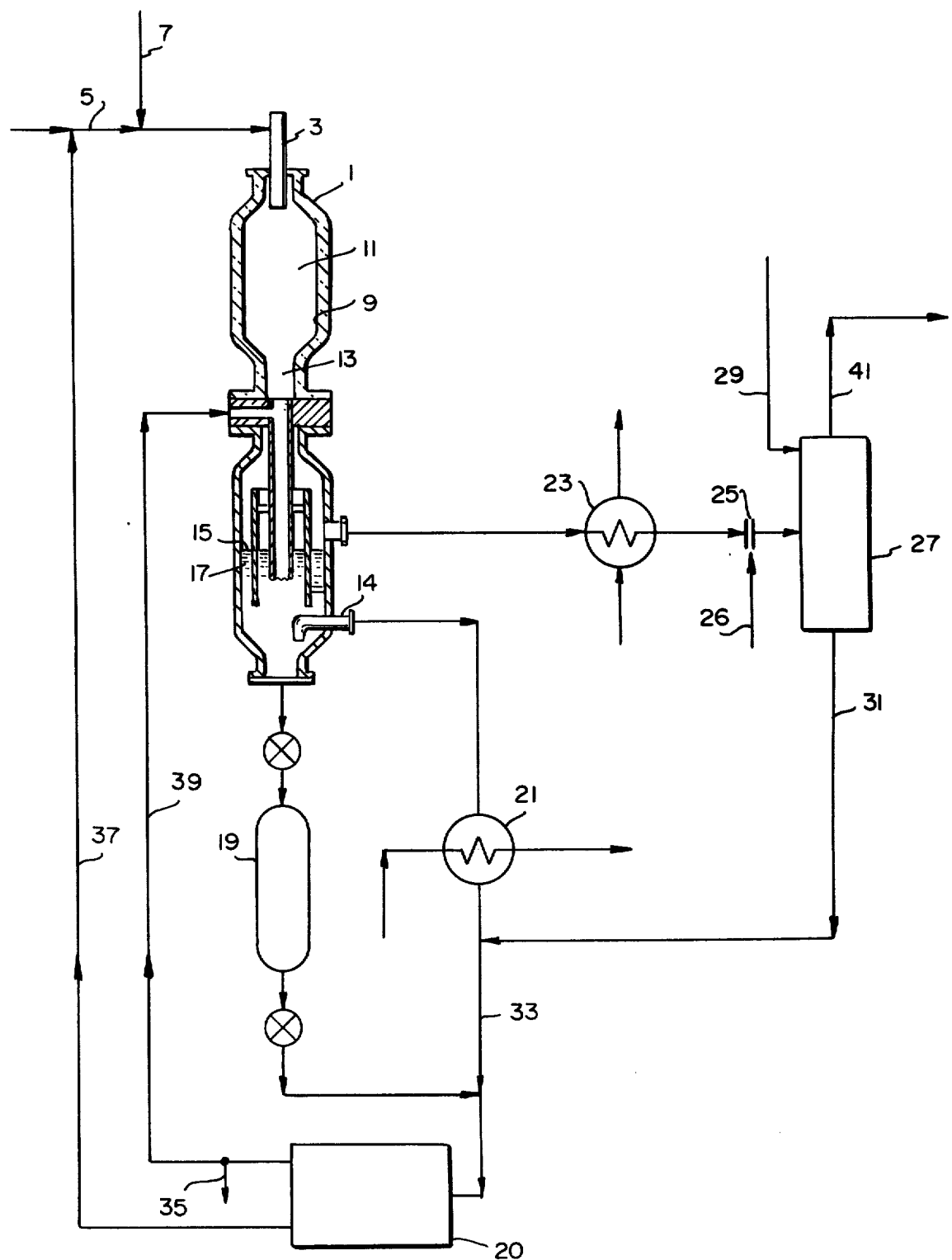

DISPOSAL PROCESS FOR HALOGENATED ORGANIC MATERIAL

BACKGROUND OF THE INVENTION

1. Field of the Invention

This invention relates to a process for converting a halogenated organic material to an environmentally benign material, and more particularly for a process for converting a halogenated organic material into an easily disposed halide salt.

2. The Prior Art

Halogenated organic materials including halogenated organic solvents, such as polychlorinated biphenyl and halogenated organic solvents having heavy metals and other environmentally sensitive solutes dissolved therein, are harmful to the environment if disposed of improperly. In recent years the disposal of these materials has come under strict regulation, such disposal in many cases is almost impossible and what disposal methods are available are relatively expensive.

A conventional method of disposal involves the high temperature incineration of the halogenated organic materials and other chemical wastes followed with an expensive scrubbing of the effluent gas. Another method involves the incineration in areas where the combustion products and emissions from the incinerator are relatively safety dispersed. Several such methods are disclosed in U.S. Pat. Nos. 4,301,137; 3,888,193; 3,305,309; and 3,140,155. In U.S. Pat. No. 4,301,137, the gas stream obtained from the pyrolysis of a solid organic waste containing halogen is contacted with a solid metal halide acceptor (such as calcium carbonate) to form the corresponding metal halide which can then be discarded or regenerated. In U.S. Pat. No. 3,888,193, the organic wastes are heated in a fluidized medium of cement clinker granules which clinker granules fix acid gases, whereby the acid gases may be removed from the waste gas. U.S. Pat. No. 3,305,309 discloses a method for converting halogenated organic materials into carbon dioxide and hydrogen halide. U.S. Pat. No. 3,140,155 sets forth an apparatus for the conversion of halogenated organic compounds into gaseous products including carbon dioxide and hydrogen halide.

Ocean-going vessels are known which have been modified to carry cargoes of hazardous chemical waste out to designated areas of the ocean where the cargoes are incinerated at high temperatures and the gaseous products are dispersed over the vast ocean areas where they are considered to be less harmful.

The incineration of the halogenated organic materials is generally costly because the hydrogen halide or halogen gas produced by such processes must be scrubbed from the effluent gas. Such treatment requires new capital intensive equipment and generally requires a high consumption of costly materials. Further, unless the combustion is carefullly controlled small amounts of free halogen may be produced and vented to the atmosphere. The combustion also can be incomplete, allowing some hazardous materials to escape with the effluent gas into the atmosphere.

Co-assigned U.S. Pat. Nos. 3,687,646; and 3,671,209 disclose methods for the incineration and disposal of sewage and garbage, respectively. Even though these systems may be able to handle very small quantities of halogenated organic materials that may be incidently found in garbage and sludge, such methods cannot efficiently dispose of relatively large quantities of halogenated organic materials.

SUMMARY OF THE INVENTION

It now has been discovered that a halogenated organic material can be disposed of by partially oxidizing it in a synthesis gas generator, together with a carbonaceous or hydrocarbonaceous material, a nitrogen compound and with a free oxygen containing gas and, optionally, with a temperature moderator, in a synthesis gas generator, under partial oxidation conditions to produce a synthesis gas that contains, amonng others, a hydrogen halide and ammonia. The synthesis gas can also contain hydrogen, carbon monoxide, carbon dioxide, hydrogen cyanide, water, nitrogen, entrained solids, but substantially no halogenated organic material and substantially no free halogen. The halogenated organic material, whether solid, liquid or gaseous, and any inorganic or organic solute therein is mixed with a hydrocarbonaceous material and a nitrogen compound. This mixture is subjected to partial oxidation with a free oxygen-containing gas, preferably in a free flow, non-catalytic gas generator to effect the substantial conversion of the halogenated organic material into a hydrogen halide under the partial oxidation conditions in the gas generator. The synthesis gas as a result of the partial oxidation of the nitrogen compound, also contains ammonia. A temperature moderator, such as water, is preferably admixed with the feedstock prior to or after its entry into the gas generator. The high temperature, high pressure and reducing conditions of the partial oxidation process insures the rapid and complete destruction of the halogenated organic material.

The hydrogen halide and ammonia rich synthesis gas from the gas generator is contacted with quench medium, generally water, to which additional ammonia may have been added. The quench medium after contacting the ammonia rich synthesis gas preferably has an ammonia content comprised of the ammonia initially present in the quench medium and that dissolved into the quench medium on contacting the ammonia rich synthesis gas, which is in excess of the chemical equivalent amount of hydrogen halide and other acid gases which dissolve into the quench medium. A portion, referred to as waste water, of the quench medium and any condensate produced by the boiling of the quench medium from the hot synthesis gas is drawn off either for disposal or for treatment with a Group IA or IIA (of the Periodic Table of the Elements) base. The base forms a halide salt which can be readily and safely disposed. The preferred method of disposal of the waste water is set forth in co-assigned U.S. Pat. No. 4,211,646 which disclosure is incorporated herein by reference. Further such Group 1A or 2A bases permit the recovery of ammonia from the quench medium which can be recycled to neutralize further quantities of hydrogen halide in the synthesis gas.

Optionally, the synthesis gas after its contact with the quench medium can be contacted with a quantity of a scrubbing medium, preferably water containing dissolved ammonia, with the ammonia content in the quench medium and in the scrubbing medium in excess of the chemical equivalent of hydrogen halide and other acids which dissolve into the quench and scrubbing medium so as to completely neutralize the hydrogen halide. The scrubbing medium can be combined with the quench medium and recycled for further treatment of fresh quantities of synthesis gas, with a portion drawn off for disposal or treatment with a Group IA or IIA base.

If the feedstocks do not contain ash or other materials aside from carbon, hydrogen, oxygen, sulfur, nitrogen and halide, the quench medium or combined scrubbing medium and quench medium which is drawn off can be acidified by an acid, such as sulfuric acid, to permit the recovery of hydrogen halide gas which then can be sold or further treated as by oxidation to halide gas. The sulfuric acid can be manufactured from the hydrogen sulfide ($H_2S$) and carbonyl sulfide (COS) recovered by acid gas scrubbing of the synthesis gas from the partial oxidation of a hydrocarbonaceous feedstock containing sulfur.

DESCRIPTION OF THE INVENTION

In a preferred embodiment of the process of the present invention, a halogenated organic material, a hydrocarbonaceous material and a nitrogen compound are partially oxidized with a free oxygen-containing gas in a free-flow, noncatalytic synthesis gas generator under partial oxidation conditions, at a temperature between about 700° C. and 2000° C. and at a pressure between about 2 and 250 atmospheres, preferably between about 10 and 150 atmospheres, and most preferably between about 30 and 80 atomspheres. The reaction optionally occurs in the presence of a temperature moderator. The resulting synthesis gas comprises hydrogen halide and ammonia, and at least one material selected from the group consisting of hydrogen, carbon monoxide, carbon dioxide, hydrogen cyanide, water, nitrogen, and entrained solids, the synthesis gas containing substantially no halogenated organic material and substantially no free halogen. The synthesis gas is then contacted with quench water, preferably having ammonia dissolved therein, which dissolves a portion of the hydrogen halide into the quench water. The quantity of ammonia in the quench water after contacting the ammonia rich synthesis gas can be in excess of the amount necessary to completely neutralize the hydrogen halide and other acids dissolved into the quench water. Solids are removed from the quench water and a portion of the quench water is withdrawn and treated with a Group IA or Group IIA (of the Periodic Table of Elements) base which forms a halide salt and permits the recycling of the ammonia back to the quench water to aid in dissolving further quantities of hydrogen halide.

In a preferred embodiment, the synthesis gas, after its contact with the quench water, is contacted with a quantity of scrubbing water containing ammonia. The scrubbing water dissolves substantially all of the remaining hydrogen halide found in the synthesis gas. The scrubbing water is preferably combined with the quench water, prior to the removal of solids and treatment by the base. In the preferred embodiment, the mixture of quench and scrubbing water has solids removed, and then a portion is removed for disposal. The withdrawn portion is treated by a Group IA or Group IIA base, and then preferably by ferrous ions and a biological reactor. Ammonia which is recovered after the addition of the base is recovered and used in both the quench and scrubbing water. The mixture of quench and scrubbing water not withdrawn is preferably recycled as quench and scrubbing water to contact further quantities of synthesis gas.

The quench and scrubbing water can be at any pH. However, as the pH rises above about 7, greater amounts of acid gases such as carbon dioxide and hydrogen sulfide are retained in the quench and scrubbing water, while increasing amounts of ammonia are retained in the synthesis gas. Further, as the pH approaches and surpasses 10 the possibility increases, under certain circumstances, of forming solid deposits such as those of ammonium carbonate or bicarbonate in the cooler portions of the apparatus.

The quench and scrubbing water are preferably below a pH of 7 except for the portion removed for disposal, which has a higher pH after the addition of the base. This permits the hydrogen halide to be dissolved without rejecting ammonia to the gas stream or forming insoluble compounds in the quench and scrubbing waters.

The halogenated organic material can comprise gaseous, liquid or solid halogenated hydrocarbonaceous material such as those used for solvents and those that are by-products of various industrial processes but have no useful value and are preferably disposed. The halogenated organic materials, especially those used for solvents, can contain many solutes including other organic materials and various metallic and non-metallic elements including those from Group IA, 2A, 2B, 4A, 5B, 6A, 6B or 8 of the Periodic Table of the Elements such as sodium, iron, nickel, phosphorous, antimony, lead, mercury, and transition metals such as vanadium and chromium.

Examples of halogenated hydrocarbons which can be disposed of by the process of the present invention include chlorinated benzenes, chlorinated phenols, and chlorinated aliphatic compounds. Other possible organic materials include plastics such a polyvinyl chloride polymers, polymeric films, fluorided polymers and rubber stocks. Liquid or gaseous halogenated organic materials can be simply mixed with the other feedstocks, while solid materials are generally ground up into small particles, whose size is similar to that of the solid feedstocks commonly used in entrained flow partial oxidation gasifiers.

The hydrocarbonaceous fuel preferably used in the process of the present invention includes gaseous, liquid and solid hydrocarbons. Almost any combustible material having carbon and hydrogen, among other elements, are useful feeds for the process of the present invention. Included as useful feeds are natural gas, methane, crude oil, shale oil, bitumen, heavy residual oil, coal, petroleum coke, sewer sludge, light hydrocarbon fuel, various coals including anthracite, bituminous, sub-bituminous and lignite, and various mixtures of the above. Also useful as feedstocks are various mixtures and slurries of the above, using among others water, hydrocarbons or other gaseous or liquid materials to form the pumpable slurry.

The nitrogen compound used with the halogenated organic material in the feedstock can include the nitrogen found in the hydrocarbonaceous material used or the nitrogen can be added as a separate compound such as an amine or as nitrogen gas admixed with the feedstock or with the oxygen rich gas used in the partial oxidation process. The larger the quantity of nitrogen gas used in the oxygen-rich gas, the lower the BTU value of the synthesis gas produced from the partial oxidation process, since the nitrogen gas in the synthesis gas is inert. Sufficient nitrogen should be present in the feedstock, or oxygen rich gas to produce at least a sufficient quantity of ammonia to replace the ammonia lost from the quench water and other scrubbing systems. Once the system is in operation and the ammonia is being recycled throughout the system, the quantity of nitrogen necessary is relatively low as a percentage of the halogen present in the feedstock, since much of the ammonia can be recycled in the system. The ability of the process to generate the ammonia needed to neutralize the hydrogen halide reduces the cost of operation of the process.

The halogen content as a percentage by weight of the total feedstock of halogenated organic material, hydrocarbonaceous material and nitrogen compound, should be less than about 10 percent by weight of the total and preferably from about 0.2 to about 5 percent by weight of the total feed to the synthesis gas generator. Larger quantities of halogen in the feedstock can cause problems, such as deterioration and corrosion of the synthesis gas generator and associated systems.

The partial oxidation is preferably carried out in a free-flow unpacked non-catalytic gas generator. The temperature is preferably within the range of about 700° to 2000° C. and at a pressure of from about 2 to 250 atmospheres, preferably between about 10 and 150 atmospheres, and most preferably between about 30 and 80 atmospheres. Under such high temperatures and pressures substantially all halogenated organic materials are rapidly converted into hydrogen halides, carbon dioxide, carbon monoxide, hydrogen cyanide, ammonia, carbonyl sulfide, carbon monoxide, hydrogen and some other minor gases and small quantities of soot. The soot is preferably recovered and recycled into the synthesis gas generator, since trace amounts of halogenated organic materials may be absorbed into such soot.

When the nitrogen used for the formation of the ammonia comprises part of an organic compound, such as the hydrocarbonaceous feed, typically about 10 percent by weight of the nitrogen in the hydrocarbonaceous feed is converted into ammonia, about 0.1 to about 0.5 percent by weight into hydrogen cyanide (HCN), with the remainder forming diatomic nitrogen ($N_2$).

The soot is preferably recovered and recycled, such as by means described in U.S. Pat. No. 2,992,906, and recycled through the partial oxidation reactor to extinction. Further, such a process can also remove organic materials, such as halogenated organic material which may not have been destroyed and is now in the waste water. If the particles of soot are large, they can simply be separated out from the water in a decantor with the large particles of soot sinking to the bottom and the clarified water being withdrawn from the top.

Because of the reducing conditions present in the gas reactor the halogen of the halogenated organic material is converted to hydrogen halide or ammonium halide. Free halogens can be formed during the complete combustion of halogenated organic materials but are not formed under the conditions in the partial oxidation gas generator. Further, other halogen compounds such as phosgene ($COCl_2$), cyanogen chloride ($CNCl$), volatile halide compounds as $AlCl_3$, $VCl_4$ and $POCl_3$ are not formed during the partial oxidation process even though aluminum, vanadium or phosphorous may be present in the feedstock. Further, under the reducing conditions present in the gas reactor, metals, especially the heavy metals which are most environmentally sensitive, such as arsenic and lead, are transformed into an insoluble form such as the sulfide. The insoluble material forms a sludge which can be removed along with the other insoluble materials from the gas generator or, if the insoluble form of metal becomes dispersed into the waste water it can be removed by lime during the waste water treatment process. Under the oxidizing conditions found in the prior art combustors, soluble forms of the metals were formed which were not readily removed from the waste water and were not concentrated for easy disposal or recycling as in the process of the present invention.

While acid gases such as carbon dioxide, formic acid, hydrogen sulfide and hydrogen cyanide are formed during the partial oxidation process within the reactor, the cooling of the synthesis gas and the subsequent water scrubbing causes the gaseous hydrogen halide to preferentially react with the ammonia. However, large excesses of ammonia in the scrubbing water should be avoided as, under some conditions, soild deposits of ammonium bicarbonate and possibly other solid ammonium compounds can accumulate in the equipment.

While the hydrogen halide is substantially absorbed in the water scrubbing, most of the non-halogen acid gases are not absorbed in the aqueous scrubber and pass through to an acid gas scrubber. The ammonium halide solution in the quench water and scrubbing water is removed as a bleedstream from the water scrubber and quench water following soot removal. Even though the quench and scrubbing water can be at any pH, they are preferably at a pH below 7 and most preferably at a pH between about 4.5 and 6. At much lower pH's there is not sufficient ammonia in the quench water to absorb the hydrogen halide. At higher pH's, such as those between about 7 and 10, ammonia is rejected to the synthesis gas stream and some acid gases, as $CO_2$ and $H_2S$ are retained in the quench and scrubbing water. At pH's above about 10, the ammonia together with carbon dioxide can generate plugging problems in the system involving solid ammonium carbonates in cooler sections of the unit. Also, some basic material, such as sodium or calcium ions, can get carried back with the soot and cause damage to the refractory lining of the partial oxidation gas generator when the soot is recycled to the partial oxidation reactor.

The bleedstream from the quench water and scrubbing water is preferably treated with a Group IA or Group IIA base, for example, lime, to raise the pH above 7. Lime as well as other Group IA and Group IIA bases cannot be added directly to the quench water or the scrubbing water, which are circulated throughout the system, because of possible plugging problems caused by the formation of insoluble salts from the reaction of the Group IA and IIA bases with hydrogen fluoride and other compounds dissolved in the quench water and scrubbing water. Thus, Group IA and Group IIA bases are not added to any portion of the scrubbing water or quench water which is recirculated through the gas reactor but is only added to a bleedstream which is withdrawn for treatment and eventual disposal. Further, this is the reason that ammonia, which does not attack the refractory lining or form insoluble compounds, is the preferred base in the quench and scrubbing water. The bleedstream drawn off for disposal can be treated in various methods including that disclosed in co-assigned U.S. Pat. No. 4,211,646 which is incorporated herein by reference as if set forth herein.

BRIEF DESCRIPTION OF THE DRAWING

The invention will be further understood by reference of the accompanying FIGURE and examples. The FIGURE is a schematic representation of a preferred embodiment of the process for the disposal of halogenated hydrocarbons.

DESCRIPTION OF THE DRAWING

In the FIGURE, an unpacked, free-flow, noncatalytic, refractory lined, gas generator 1 has an annulus type burner 3 mounted in its upper portion. Fed into the burner 3 are several possible feedstocks which include hydrocarbonaceous materials such as oil, natural gas, coal or any of the other gaseous, liquid or solid feedstocks useful in the process of the present invention which were previously noted. Also forming part of the feedstock, whether mixed with the hydrocarbonaeous feed, or otherwise added to the gas generator is the halogenated organic material, such as those previously mentioned. The organic material can be gaseous, liquid or solid, and preferably does not comprise more than about 10 percent by weight of the total feed into the gas generator 1, and more preferably comprises less than about 5 percent by weight of the feed into the gas generator 1. The feed also contains a nitrogen compound. Generally the nitrogen comprises a small portion, less than about 10 percent by weight, of the hydrocarbonaeous feed, since most naturally occurring high boiling hydrocarbonaceous feedstocks contain some nitrogen.

An optional component of the hydrocarbonaceous feedstock is steam. The feedstock can also contain a large percentage of a carrier, such as oil or water, which acts to carry the other feedstocks into the burner and can also function as a temperature moderator. The carrier can also contain carbon from the carbon recovery zone so that carbon within the process is recycled to extinction.

Also shown being fed into the burner 3 is a free oxygen-containing gas which can comprise pure oxygen, enriched oxygen containing more than 22 mole percent oxygen, or air. The free oxygen-containing gas can contain nitrogen which is useful in the gas generator 1 to produce ammonia for use in the further processing of the synthesis gas. The feedstocks are preferably fed from line 5 into burner 3. The free oxygen containing gas is fed from line 7 into burner 3. Alternately, the free oxygen-containing gas can be added to the steam which can be fed with the hydrocarbonaceous feed in line 5. A preferred partial oxidation process and apparatus is disclosed in coassigned U.S. Pat. No. 4,074,981, which is incorporated herein by reference.

The gas generator 1 is preferably lined with a refractory material 9. Within the interior of the gas generator 1 the various feedstocks with the free oxygen-containing gas are partially oxidized. The effluent synthesis gas stream produced in the reaction zone 11 within the gas generator 1 passes through a passageway 13 at the end of the gas generator 1 into a pool of quench water 15 located in quench tank 17. The ammonia and hydrogen halide produced within the reaction zone 11 dissolve into the water 15 within the quench tank 17. Periodically a water slurry of solid matter which includes ash, metal salts, carbon and some dissolved hydrogen halide, and other soluble and insoluble products of the partial oxidation process can be removed and sent to a liquid-solid separating zone through a conventional lock hopper system 19. Within the liquid-solid separating zone (not shown) solids, such as ash and possibly carbon, are removed, generally by settling or other known processes. The water can be returned to the hydrocarbonaceous feed in feedline 5 for recycling to extinction (not shown) or the water can be sent to the carbon recovery zone 20.

A continuous stream of quench water 15, containing carbon particles, hydrogen halide, ammonia, and other dissolved reaction products from the gas generator 1, is withdrawn from the bottom of the quench tank 17 through line 14. The quench water is then passed through a waste heat recovery system 21 and then to a carbon recovery zone 20, where carbon is removed.

The synthesis gas, after being contacted with the quench water 15 in the quench tank 17, is passed through an optional cooler 23 and then into a venturi-type scrubber 25, wherein the synthesis gas stream, which can still contain hydrogen halide, ammonia, carbon and other reaction products, is contacted with a stream of clarified water from the carbon recovery zone 20. The clarified water enters the scrubber 25 through line 26. The stream of water and gas from the orifice or venturi-type cleaner 25 then goes into a separation tank 27. Preferably an aqueous stream containing dissolved ammonia is directed through line 29 into the separation tank 27.

From the separator 27 sooty water containing not only carbon particles but also any remaining hydrogen halide and ammonia from the gas stream is withdrawn through line 31. The sooty water from the separator 27 is combined with quench water 15 from tap 14. The mixture proceeds through line 33 to the carbon recovery zone 20 and eventually to waste water treatment through line 35, or recycling to the gas generator 1 through line 37 or recycling to the quench tank 17 through line 39.

The quantity of ammonia present in the quench water 15, in the subsequent scrubbing water in scrubber 25 and in the aqueous ammonium stream in separator 27 is preferably more than is necessary to react with all of the hydrogen halide in the synthesis gas stream. However, the quantity of ammonia and other dissolved basic materials in the water should not cause the pH of the water throughout the system to be over about 7, and most preferably the pH should be about between 4.5 and 6. A lower pH will prevent all of the hydrogen halide from being dissolved into the water and a higher pH will cause some of the ammonia to be rejected into the gas stream, which is not generally desired.

The synthesis gas stream exiting through line 41 from the separator 27 contains substantially no ammonia or hydrogen halide but can contain hydrogen, carbon monoxide and several acid gases. The acid gases can be scrubbed out in conventional acid gas treatment systems (not shown). Further, the synthesis gas can be treated over a water gas shift catalyst (not shown), wherein hydrogen cyanide present in the gas stream is destroyed and the gas is water shifted as desired.

The mixture of quench water 15 and scrubbing water from the separator 27 is combined with the water from the lock hopper 19 and passed through line 33 to a carbon recovery zone 20 which is preferably that disclosed in co-assigned U.S. Pat. No. 2,992,906, which is incorporated herein by reference. Therein, the carbon is separated out from the water by contact with naphtha. Any trace of unburned halogenated organic material dissolves from the water into the naphtha. The carbon-naphtha phase is then separated from the water. The naphtha is then combined with fresh feed. The naphtha is generally recovered from the feed by a naphtha stripper (not shown) for recycling. The carbon and any traces of halogenated organic material which was present in the water is thereby recovered and recycled through lines 37 and 5 to the gas generator 1 to extinction. With certain types of feed, such as coal, the carbon produced is of sufficient size so that recovery using naphtha is not always necessary. With such feeds the carbon recovery zone 20 can simply be a decanter, wherein the carbon particles present in the water are sufficiently large to settle to the bottom of the decanter on standing. A carbon-water slurry from the decanter is then recycled through lines 37 and 5 to the gas generator 1 to extinction.

Clarified water is drawn from the carbon recovery zone 20 and is recycled to the quench tank 17, through line 39, to the venturi scrubber 25, through line 26, and through line 29 as part of the aqueous ammonia stream to the separator 27. Further, a small part of the clarified water is withdrawn through line 35 to the waste water treatment facility (not shown).

The waste water from the system is preferably treated as in co-assigned U.S. Pat. No. 4,211,646, which patent is incorporated herein by reference. In co-assigned U.S. Pat. No. 4,211,646 ferrous ions are supplied in the form of a ferrous salt such as ferrous sulfate, ferrous chloride, or similar ferrous compounds to the waste water. The moles of ferrous ions added is preferably an amount in excess of the total moles of cyanides present in the waste water. Preferably, the moles of ferrous ion added should be from about 1.2 to about 10 times the moles of cyanide present in the waste water, with the most preferred amount of ferrous ions being from about 2 to about 6 times the moles of total cyanide present. The waste water should be at a pH in the range from about 7 to about 9 during the addition of the ferrous ions. The pH can be adjusted with lime or with other conventional materials to bring it to the desired range. Preferably the waste water is at a temperature between about 80° and 95° C. during the treatment with the ferrous ions.

After treatment with the ferrous ions the waste water is next treated with a base or basic reactant material to adjust the pH of the treated waste water to the range of from about 9 to about 11. This effects the precipitation of a sludge containing the cyanide ion from the treated waste water. Preferably the bases employed in this step comprise Group IA and Group IIA bases such as the oxides, hydroxides, and carbonates of alkali metals and alkaline earth metals. The preferred bases are lime, sodium hydroxide, magnesium hydroxide and sodium carbonate. Lime or calcium oxide, which in solution becomes calcium hydroxide, is particularly preferred for this step of the process.

The lime and the ferrous ions act to weigh down the sludge precipitate which is formed during the addition of these materials and is also effective for removing suspended solids. It has also been found that lime enhances the biological activity in the biological reactor which is used for further processing of the waste water.

After the sludge has formed and settled, or precipitated, following the addition of the base, the waste water is separated from the sludge and is then is fed to a biological reactor. The waste water contains high levels of formates. In the biological reactor the formates in the waste water are converted to carbon dioxide and a biological residue.

The waste water prior to being passed into the biological reactor is preferably sent into an ammonia stripping tower where a major fraction of the ammonia is removed. The ammonia is then used as desired in the quench water and in the ammonia containing stream added to the separator. This ammonia adjusts the pH of the quench water and scrubbing water to that within the desired range to effect the most complete reaction with hydrogen halide in the synthesis gas stream.

The heavy metals and other environmentally significant contaminants are removed in the various sludges or precipitates formed throughout the partial oxidation and the waste water treatment process so that the waste water leaving the treatment process has no substantial quantities of environmentally significant contaminants. Thus, the process of the present invention takes in halogenated organic materials which are highly environmentally damaging and whose disposal has become a serious problem, and converts them into a useful synthesis gas and precipitates or sludges of relatively harmless salts which are readily disposed of and which have minimal environmental impact.

The following examples further illustrates the process of the present invention.

EXAMPLE I

A water slurry containing about 60 weight percent solids is fed into a gasifier as shown in FIG. 1. The 60 weight percent solids comprise about 1 percent by weight of a halogen, about 2 percent by weight of a carbon material which is recirculated from the soot recovery system, and the remainder, about 57 percent by weight, comprises substantially a hydrocarbonaceous material, bituminous coal and some halogenated organic material which halogenated organic material contains most of the 1 percent by weight halogen in the feed. The feedstock also contains small quantities of nitrogen, generally as nitrogen fixed in the hydrocarbonaceous feedstock. The slurry is fed into a gasifier and partially oxidized within the gasifier using substantially pure oxygen.

The hot effluent synthesis gas is fed into a quench tank containing water having small quantities of ammonia dissolved therein. Substantial quantities of the hydrogen halide, ammonia, and other water soluble by-products of the partial oxidation process dissolve into the quench water. The quench water is kept at a pH below about 6.

The synthesis gas stream is then passed through a heat exchanger where it is cooled. The gas then goes on to a venturi-type scrubber where it is contacted with further quantities of water having a pH below about 7 and containing ammonia dissolved therein. The mixture of scrubbing water and synthesis gas then passes into a separator where further quantities of ammonia containing scrubbing water are added. Sufficient ammonia is present in the added water so that there is an excess of ammonia present in the separator, thus forcing all the hydrogen halide in the gas to dissolve into the water. The pH of the water in the separator is below 7 and preferably below 6 so that ammonia is not rejected into the gas stream. The synthesis gas from the separator is then passed on to a water shift gas catalyst and/or to other processing facilities as desired.

The quench water along with any slag removed from the quench tank, and the water from the separator are combined and sent to a carbon recovery zone which comprises a decanter, wherein the water is allowed to stand. A carbon slurry is withdrawn from the bottom of the decanter and is recycled to the feedstock. Clarified water is taken from the top of the decantor and is recycled to the quench tank, the venturi scrubber and also to the top of the separator tank. During the recycling of the water, particularly that to the separator tank, ammonia is added to the water.

A small quantity of the water from the decanter is withdrawn for waste treatment. The waste water is introduced into a first reaction vessel under a nitrogen atmosphere, preferably at a temperature of about 85° C. A solution of ferrous sulfate and concentrated sulfuric acid is added to the waste water in the first reactor at the rate of about 1 gram of ferrous sulfate per liter of waste water, and about 8 milliliters of concentrated sulfuric acid per liter of waste water. The reaction mixture is maintained at a temperature of about 80° C. with constant agitation for several minutes.

Treated waste water from the first reactor is directed to a second reactor wherein calcium hydroxide is added to the waste water at the rate of about 5 grams per liter of waste water with constant agitation for several minutes. The treated waste water from this second reactor is passed into a clarifier which removes suspended solids from the waste water in the form of a sludge.

The waste water from the clarifier is passed into a stripping tower, wherein a major fraction of the ammonia is removed. The ammonia is recycled as quench water and as scrubbing waters including that scrubbing water that is passed into the separator tower to absorb further quantities of hydrogen halide. Any ammonia not necessary for such functions can be used as desired or sold.

The water from the ammonia stripper is passed into a biological reactor, wherein organic material such as formates is consumed and converted to carbon dioxide and a biological residue suitable for disposure. The waste water from the biological reactor is characterized by having very small quantities of pollutants and is of a sufficiently high environmental quality to be easily and cheaply disposed.

EXAMPLE II

A water slurry of a residue oil and water is fed into a gasifier as shown in FIG. 1. The residue oil is any of the oil fractions or bottoms remaining after refining which has little or no value. To the residue oil is added a halogenated organic material so that the halogen comprises about 1 percent by weight of the mixture of oil and halogenated organic material. The oil also contains about 0.8 percent fixed nitrogen. The water slurry also contains about 2 percent by weight of a carbon material which is recirculated from the soot recovery system. The slurry is fed into a gasifier and is partially oxidized within the gasifier using substantially pure oxygen. The hot effluent synthesis gas is cooled, scrubbed and processed as in Example I.

The quench water and the water from the separator are treated in a carbon recovery zone as in Example I. However, the carbon recovery process is similar to that disclosed in co-assigned U.S. Pat. No. 2,992,906. The carbon which is recovered in the carbon recovery zone is recycled to the gas generator to extinction. The water from the carbon recovery zone is recycled as in Example I. A small quantity of water from the carbon recovery zone is withdrawn for waste treatment. This waste treatment is essentially similar to that disclosed in Example I.

EXAMPLE III

In another embodiment of the process of the present invention wherein a halogenated organic material is partially oxidized and converted into an environmentally harmless material, the feedstock is ashless and contains only carbon, hydrogen, oxygen, sulfur, nitrogen and a halide. The ashless feedstock is mixed with about 40 percent by weight water, forming a pumpable slurry and having about 1 percent by weight halide, most of which is in the form of a halogenated organic material.

The synthesis gas produced by the partial oxidation of the ashless feedstock in the gasifier shown in FIG. 1 is contacted with a quench water containing ammonia as in Example I to dissolve much of the hydrogen halide into the quench water. There is no necessity of having nitrogen in the feedstock so long as ammonia is present in the quench water. However, the presence of nitrogen in the feedstock does add ammonia and reduces the necessity of obtaining ammonia from other sources.

The synthesis gas is scrubbed and separated as in Example I and a portion of waste water is withdrawn after soot removal. However, the treatment of this waste water is different than that in Example I. The water water is first acidified by sulfuric acid, wherein substantially all of the halide in the waste water is converted back to hydrogen halide. The waste water after acidification is stripped, wherein the hydrogen halide, mostly hydrogen chloride, is removed by conventional stripping techniques.

The hydrogen halide gas can then be collected and used as such, or can be oxidized in a further process into water and halide gas. The halide gas, since it is concentrated, has commercial use or can be sold. The stripper can also remove other hydrogen acid gases such as hydrogen cyanide, from the waste water. These acid gases can be also oxidized into water, nitrogen and carbon dioxide.

The acidified waste water after stripping can be made basic with the addition of ammonia, producing ammonium sulfate $(NH_4)_2SO_4$. The ammonia sulfate can be recovered and used as desired.

Sulfuric acid for the acidification can be manufactured from the hydrogen sulfide and carbonyl sulfide recovered by the acid gas scrubbing of the synthesis gas when the hydrocarbonaceous feedstock contains sulfur.

The above figure and Examples are for illustrative purposes only and are not meant to limit the invention which is set forth in the following claims.

What is claimed is:

1. A method for disposing of a halogenated organic material comprising the steps of partially oxidizing said halogenated organic material, a hydrocarbonaceous material, and a nitrogen compound with a free oxygen containing gas, and optionally with a temperature moderator, in a synthesis gas generator in the reducing atmosphere of partial oxidation conditions to produce a synthesis gas containing hydrogen halide, ammonia and at least one material selected from the group consisting of hydrogen, carbon monoxide, carbon dioxide, hydrogen cyanide, water, nitrogen, and entrained solids, said synthesis gas containing substantially no halogenated organic material and substantially no free halogen; contacting said synthesis gas with a quench medium containing ammonia to dissolve said hydrogen halide and ammonia into said quench medium; subsequently contacting said halide containing synthesis gas with a scrubbing medium containing ammonia; said quench medium and said scrubbing medium having ammonia dissolved therein in excess of the chemical equivalent amount of hydrogen halide and other acid gases which dissolve into the quench medium and scrubbing medium, said quench medium and said scrubbing medium having a pH between about 4.5 and 6 and remaining at such pH while contacting said hydrogen halide synthesis gas; and disposing of said ammonia neutralized hydrogen halide containing quench medium.

2. The method of claim 1 wherein after contacting the hydrogen halide containing gas, any solids in the quench medium are recycled to the gas generator; a portion of said quench medium and said scrubbing medium is disposed of; fresh medium is added if necessary; and said remaining quench medium and scrubbing medium are recycled for use as quench medium, and scrubbing medium.

3. The method of claim 2 wherein said portion of said quench medium and scrubbing medium is disposed of by the steps of adding a Group IA or Group IIA base to said portion to increase the pH above 7 and to form Group IA or Group IIA halide salts.

4. The method of claim 3 and further comprising the step of stripping ammonia from the base treated portion and recycling said ammonia to said quench medium and said scrubbing medium.

5. The method of claim 3 and further comprising the steps of treating said portion with ferrous ions prior to said step of adding Group IA or Group IIA base to said portion, and then treating said portion with added ferrous ions and base in a biological reactor.

6. The method of claim 1 wherein said nitrogen compound comprises diatomic nitrogen gas.

7. The method of claim 1 wherein said nitrogen compound comprises a nitrogen containing hydrocarbonaceous material.

8. The method of claim 1 wherein said halogenated organic material, said hydrocarbonaceous material, and said nitrogen compound are partially oxidized at a temperature between about 700° and 2000° C. and at a pressure between about 30 and 80 atmospheres.

9. A method for disposing of a halogenated organic material comprising the steps of partially oxidizing said halogenated organic material, a hydrocarbonaceous material, and a nitrogen compound with a free oxygen-containing gas, and optionally with a temperature moderator, in the reducing atmosphere of partial oxidation conditions in a free-flow non-contalytic gas generator at a temperature of between about 700° and 2000° C. and at a pressure between about 10 and 150 atmospheres to form a synthesis gas, said halogenated organic material not comprising more than about 10 percent by weight of the total feed into the gas generator, said synthesis gas containing a minor proportion of hydrogen halide from the partial oxidation of said halogenated organic material, ammonia from the partial oxidation of a portion of said nitrogen compound, and a major proportion of at least one material selected from the group consisting of hydrogen, carbon monoxide, carbon dioxide, hydrogen cyanide, water, nitrogen and entrained solids, said synthesis gas containing substantially no halogenated organic material and substantially no free halogen; contacting said synthesis gas with quench water having ammonia dissolved therein; subsequently contacting said hydrogen halide containing synthesis gas with a quantity of scrubbing water containing ammonia; said quench water and said scrubbing water having ammonia dissolved therein in excess of the chemical equivalent amount of hydrogen halide and other acid gases which dissolve into the quench water and scrubbing water, said quench water and said scrubbing water having a pH between about 4.5 and 6 and remaining at such pH while contacting said hydrogen halide synthesis gas removing solids from said quench water, disposing of a portion of said quench water, said disposal step including the treatment of a portion of said quench water to be disposed with a Group IA or Group IIA base to permit the recovery of said ammonia and the reaction of said hydrogen halide to form a Group IA or Group IIA base to permit the recovery of said ammonia and the reaction of said hydrogen halide to form a Group IA or Group IIA salt; and recycling the remainder of said quench water to contact further quantities of synthesis gas.

10. The method of claim 9 and further comprising the step of contacting said hydrogen halide containing synthesis gas, after its contact with said quench water, with a quantity of scrubbing water containing ammonia.

11. The method of claim 10 and further comprising the step of combining said hydrogen halide and ammonia containing scrubbing water, after its contact with said synthesis gas, with said quench water prior to said step of removing solids from said quench water and prior to said step of disposing of a portion of said quench water by treatment with a Group IA or Group IIA base.

12. The method of claim 10 wherein the ammonia recovered after the addition of said Group IA or Group IIA base is recycled to said quench water and to said scrubbing water to react with further quantities of hydrogen halide.

13. The method of claim 9 wherein said halogenated organic material, said hydrocarbonaceous material, and said nitrogen compound are partially oxidized at a pressure between about 30 and 80 atmospheres.

14. The method of claim 9 and further comprising the step of reacting said synthesis gas after its contact with said quench water over a water gas shift catalyst to hydrolyze cyanides in said synthesis gas to ammonia and carbon dioxide.

* * * * *